Patented Jan. 10, 1933

1,893,969

UNITED STATES PATENT OFFICE

WESLEY C. STOESSER, OF MIDLAND, MICHIGAN, ASSIGNOR TO THE DOW CHEMICAL COMPANY, OF MIDLAND, MICHIGAN, A CORPORATION OF MICHIGAN

METHOD OF SEPARATING CUPROUS AND AMMONIUM CHLORIDES

No Drawing.  Application filed May 23, 1930.  Serial No. 455,149.

This invention relates to a method for separately recovering cuprous chloride and ammonium chloride from aqueous solutions containing the same, and particularly from the aqueous liquors resulting from the process for making an arylamine by reaction of a chlorinated aromatic hydrocarbon and aqueous ammonia solution.

In the process just referred to one mole of a chlorinated aromatic hydrocarbon, e. g. chlorobenzene, is reacted with an excess, e. g. about 5 moles, of ammonia in 28 to 30 per cent solution by heating under pressure at a temperature between 150° and 250° C., according to the equation:

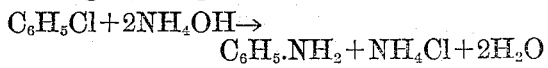
$$C_6H_5Cl + 2NH_4OH \rightarrow C_6H_5.NH_2 + NH_4Cl + 2H_2O$$

For facilitating the reaction about 0.1 to 0.2 mole of a cuprous compound, e. g. cuprous oxide or chloride, is added to the reaction mixture. When the reaction is complete, the product is discharged from the reactor into a receiver wherein it separates into two liquid layers, one containing the arylamine product together with unreacted chlorobenzene and the other an aqueous layer containing excess ammonia, ammonium chloride, cuprous compound and small amounts of dissolved arylamine and phenol. It is among the objects of the invention to provide improved procedure for separating and recovering the constituents of such water layer.

The more volatile constituents of the aforesaid water layer, i. e. ammonia, water, arylamine and phenol, may be distilled off and the valuable products in the distillate separately recovered according to known methods, leaving a dry residue containing the ammonium chloride and cuprous chloride. From such residue I have found that nearly all of the ammonium chloride may then be sublimed off by heating at a suitably elevated temperature to yield directly an ammonium chloride product containing only a very small amount of cuprous chloride impurity, while the final residue may consist essentially of cuprous chloride containing not more than about 1 to 3 per cent ammonium chloride. The invention, then, consists of the steps hereinafter fully described and particularly pointed out in the claims, the following description setting forth but a few of the various ways in which the principle of the invention may be used.

The water layer obtained from the manufacture of aniline, which may be taken as a typical example of a solution to be worked up according to the invention, has the following approximate composition:

| | Per cent |
|---|---|
| $NH_3$ | 12–15 |
| $NH_4Cl$ | 13–20 |
| $CuCl$ | 8–15 |
| $C_6H_5.NH_2 + C_6H_5OH$ | 1.5– 3 |

Such water layer has heretofore been worked up by adding an alkali to decompose the ammonium chloride and precipitate cuprous oxide or hydroxide, distilling off free ammonia and aniline, and filtering off the precipitated copper compound from the residual aqueous solution containing the phenol present as phenate. By such treatment the valuable by-product ammonium chloride is not recovered as such, but is reconverted to ammonia, while the chlorine content of the chlorobenzene reacted is lost and a considerable consumption of alkali is necessitated.

My improved process avoids all of the aforesaid disadvantages and in a simple and direct way leads to important economies in the general process for making aniline or other arylamines. Such process is based upon the discovery that ammonium chloride may be almost completely separated from mixtures thereof with cuprous chloride by subliming at a temperature between 340° C. and about 450° C., the sublimed product containing not more than a small fraction of 1 per cent cuprous chloride.

For carrying out the process, the aforementioned aqueous layer separated from the arylamine product of the reaction is first distilled, conveniently at atmospheric pressure, until all of the water therein has been removed. In this way the free ammonia present is first distilled off, and then the small amounts of arylamine and phenol are distilled with the steam. To avoid oxidation of the cuprous chloride it is advisable to displace all of the air in the still before commencing the distillation, as by blowing out with steam, thus establishing therein a substantially non-oxidizing atmosphere which is maintained during the distillation. As an added precaution for preventing oxidation a stream of an inert gas, e. g. nitrogen, may be passed into the still continuously during the distillation. When all of the water has been distilled over, the temperature is raised sufficiently first to melt the residue of cuprous chloride and ammonium chloride and then to heat the molten mixture up to the subliming point of ammonium chloride, i. e. about 340° C. If the temperature is then further raised gradually up to about 400° to 450° C. nearly all of the ammonium chloride may be sublimed off accompanied by only a slight amount of cuprous chloride, while the bulk of the latter remains as liquid in the still from which it may be run into suitable containers and allowed to solidify.

As a specific example, 306.5 cubic centimeters of the water layer from the aniline reaction, containing 100 grams of solids consisting of 60.8 per cent $NH_4Cl$ and 39.2 per cent $CuCl$, were distilled at atmospheric pressure to remove ammonia, phenol, aniline and all of the water, while a slow stream of nitrogen was passed into the still. Thereupon the heat supply was increased to raise the temperature of the residual still contents above 340° C., the still-head being maintained at a temperature between 350° and 400° C. until sublimation of ammonium chloride substantially ceased. There were recovered 53.7 grams $NH_4Cl$ containing 0.10 per cent Cu, the yield of $NH_4Cl$ being 88.3 per cent. Repeating the distillation and sublimation after adding 306.5 cubic centimeters additional of water layer to the still residue, but maintaining the still-head temperature during the sublimation of ammonium chloride at 400° to 450° C., 54.4 grams $NH_4Cl$, containing 0.16 per cent Cu, were recovered, the yield of $NH_4Cl$ being 89.5 per cent. The combined still residues amounted to 78.2 grams containing by analysis 96.5 per cent $CuCl$ and 2.5 per cent $NH_4Cl$. The total yield of $CuCl$ was 96.2 per cent.

The aqueous solution resulting from the preparation of other arylamines by reaction of a chlorinated aromatic hydrocarbon and ammonia may be worked up in similar manner for the recovery of the products contained therein. The invention is likewise applicable to the separation of cuprous chloride and ammonium chloride in any solution containing the same from whatever source derived, by distilling off first the water and then subliming ammonium chloride from the dry mixed salts by heating under substantially non-oxidizing conditions at a temperature between 340° and 450° C.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. The process of separating cuprous chloride and ammonium chloride from an aqueous solution containing the same which comprises removing the water by vaporization therefrom under non-oxidizing conditions and subliming ammonium chloride from the dry residue.

2. The process of separating cuprous chloride and ammonium chloride from an aqueous solution containing the same which comprises removing the water by vaporization therefrom under non-oxidizing conditions and subliming ammonium chloride from the dry residue by heating the same at a temperature between 340° and 450° C.

3. The process of recovering cuprous chloride and ammonium chloride from the aqueous solution resulting from the reaction between a chlorinated aromatic hydrocarbon and ammonia which comprises distilling such solution under substantially non-oxidizing conditions to remove ammonia, phenol, arylamine and water therefrom and subliming ammonium chloride from the dry residue.

4. The process of recovering cuprous chloride and ammonium chloride from the aqueous solution resulting from the reaction between a chlorinated aromatic hydrocarbon and ammonia which comprises distilling such solution under substantially non-oxidizing conditions to remove ammonia, phenol, arylamine and water therefrom and subliming ammonium chloride from the dry residue by heating the same at a temperature between 340° and 450° C.

5. The process of recovering cuprous chloride and ammonium chloride from the aqueous solution resulting from the reaction between a chlorinated aromatic hydrocarbon and ammonia which comprises distilling such solution under substantially non-oxidizing conditions to remove ammonia, phenol, arylamine and water therefrom, subliming ammonium chloride from the dry residue by heating the same at a temperature between 340° and 450° C., collecting the sublimed product and drawing off molten cuprous chloride from the still.

6. The process of recovering from an aqueous solution containing cuprous chloride and ammonium chloride, said chlorides separately, each substantially free from the other, which comprises distilling off the water under substantially non-oxidizing conditions to obtain the dry residue consisting of cuprous chloride and ammonium chloride and then raising the temperature thereof while under substantially non-oxidizing conditions to separate the ammonium chloride as a sublimate.

Signed by me this 16th day of May, 1930.

WESLEY C. STOESSER.